Jan. 5, 1971 L. R. WOODS 3,553,562
BATTERY CHARGING CIRCUIT
Filed Dec. 12, 1968

LEROY R. WOODS
INVENTOR.

BY Spensely & Horn
ATTORNEYS

United States Patent Office 3,553,562
Patented Jan. 5, 1971

3,553,562
BATTERY CHARGING CIRCUIT
Leroy R. Woods, Granada Hills, Calif., assignor to Woodbro Corporation, Van Nuys, Calif., a corporation of California
Filed Dec. 12, 1968, Ser. No. 783,300
Int. Cl. H02j 7/04
U.S. Cl. 320—39                                                 15 Claims

ABSTRACT OF THE DISCLOSURE

A circuit for charging a battery is disclosed which provides an indication of the capacity of the battery, the state of the charge of the battery, the loss of the battery from the circuit, and the presence of charging power. The circuit recharges the battery when the battery terminal voltage reaches a predetermined level. There is no continuous trickle charge required or necessarily applied to the battery.

BACKGROUND OF THE INVENTION (1) Field of the invention

The invention relates to the field of circuitry for charging batteries.

(2) Prior art

Batteries are an important part of our technological world. They form an essential element in almost every emergency power system. For example, emergency generators which are driven by combustion engines require battery power to start the combustion engines. In countless other emergency power systems, batteries are utilized to provide energy for the control functions in these systems. In other applications, batteries are the sole source of energy when the main power system fails.

The batteries utilized in emergency systems often remain dormant for considerable periods. These batteries while not in continuous use obviously must be operational. Numerous charging devices for batteries are commercially available with attempt to maintain these batteries in a fully charged and operational condition.

Existing charging devices have at least one of the following disadvantages:

(A) Some chargers provide a continuous trickle charge to the battery in order to keep it fully charged. This trickle charge causes corrosion of the battery thereby reducing its life.

(B) Many existing devices do not give an indication when the battery is completely removed from the circuit. Thus, if the battery is removed, stolen, or the coupling between the battery and the charging device opens, this condition goes undetected.

(C) In most charging devices, no load is placed on the battery once it is fully charged. Unless a load is placed on the battery, the capacity of the battery cannot be determined. For example, if a battery was replaced by a capacitor, most circuits would indicate that the battery was fully charged and operational, yet the capacitor would contain almost no energy. As a battery ages, it may be compared with a capacitor, that is, it may have the proper terimnal voltage and at the same time possess very little energy.

(D) Some battery charges give no indication of the state of charge of the battery.

(E) A few battery charging devices do not give any indication when the power supplied to the device is interrupted.

SUMMARY OF THE INVENTION

A circuit for charging a battery utilizes a voltage regulator for regulating the direct current voltage applied to the battery. The output voltage of the regulator is controlled by the battery voltage and a reference voltage. A portion of the reference voltage is developed across a parallel combination of a diode and resistor. This parallel combination is also coupled to the battery through a current limiting resistors. When the battery is fully charged, the resistor, coupled across the diode, causes the diode to cease conducting thereby causing the voltage regulator to discontinue charging the battery. When the terminal voltage of the battery drops to a predetermined level, the diode aagin conducts causing the voltage regulator to recharge the battery.

It is an object of this invention to provide a circuit for charging a battery that periodically charges the battery.

It is a further object of the present invention to provide a battery charging circuit that indicates the state of charge in the battery.

It is still another object of this invention to provide a circuit which gives an indication when the battery is not in the circuit or when the charging power is removed from the circuit.

It is still a further object of this invention to provide a battery charging circuit which applies a load to the battery.

It is a further object of this invention to provide a battery charging circuit that indicates the capacity of the battery.

DETAILED DESCRIPTION OF THE INVENTION

Figure 1:
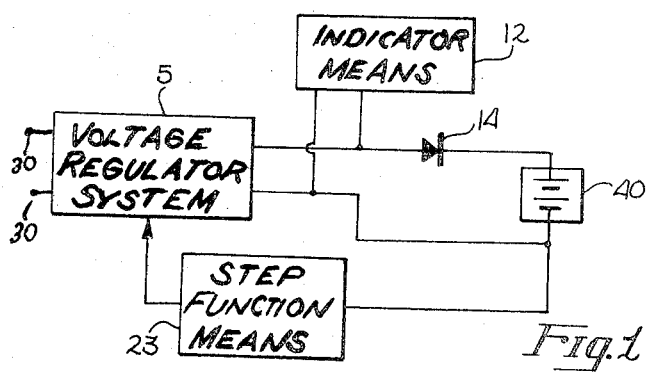
FIG. 1 is a generalized functional schematic diagram of the charging system of the present invention.

A general understanding of the invention may be obtained by referring to FIG. 1 which broadly shows the invention. The generalized system comprises a voltage regulator system 5 which regulates the voltage applied to battery means 40. The voltage regulator system 5 (in addition to its own internal regulation resulting from the sensing of the terminal voltage of the battery) is controlled by step function means 23. Step function means 23, which is coupled to battery 40 and voltage regulator system 5, senses a voltage related to the terminal voltage across battery 40 and at a predetermined value of such voltage provides a step function signal. This signal is coupled to voltage regulator system 5 and operates to substantially lower the output voltage of voltage regulator system 5. In a typical system, the output of voltage regulator system 5 is decreased from approximately 12 to 14 volts to 6 volts or by approximately 50%. This decrease in the output of voltage regulator system 5 occurs when battery 40 is substantially fully charged.

Coupled between voltage regulator system 5 and battery 40 is diode 14 which isolates the voltage regulator system 5 from battery 40 unless the differential in the output voltage of the regulator system 5 and battery 40 is such that diode 14 is forward biased. In general, this occurs when the output voltage of the voltage regulator system 5 is in excess of the terminal voltage of battery 40 by a predetermined amount. In the invented system, this will occur periodically as step function means 23, in addition to the above stated functions, provides a means for continuously loading the battery and thereby gradually decreasing the charge of said battery. This loading periodically causes the voltage regulator system 5 to charge battery 40.

Indicator means 12 is connected across the output terminals of voltage regulator system 5 to indicate the output voltage of the regulator system. The rate at which voltage regulator system 5 periodically charges battery 40 and consequently the rate at which indicator means 12 is energized is indicative of the capacity of battery 40. In addition, indicator means 12 will indicate the state of the charge of the battery, presence of charging power to the charging circuit and the presence of the battery in the charging circuit. The specific details as to how these indications are obtained will be explained in connection with FIGS. 2 and 3.

In general, the system of FIG. 1 operates in the following manner. Voltage regulator system 5 will forward bias diode 14 when its output voltage exceeds that of battery 40 by a predetermined amount. Up until this point, the output of the voltage regulator system 5 gradually increases which increase is reflected by indicator means 12. In the case where indicator means 12 is a lamp, its brightness will gradually increase until diode 14 is forward biased at which time indicator means 12 will glow especially brightly. After diode 14 is forward biased, battery 40 will receive a charge until it reaches a predetermined terminal output voltage which will cause step function means 23 to provide a signal that substantially reduces the output voltage of voltage regulator system 5. This will be indicated by indicator means 12 which in the case of a lamp, will essentially turn off or become dim. Battery 40 will then gradually discharge via the load provided by step function means 23. After a predetermined amount of discharge, the cycle will again be repeated. This cycle and its repetition rate will indicate the capacity of battery 40 as the capacity of battery 40 deteriorates, the rate of the cycle will increase. When the battery 40 is completely taken out of the circuit, indicator means 12 will give the most extreme indication possible. This will be understood in detail from the explanation which follows.

Figure 2:
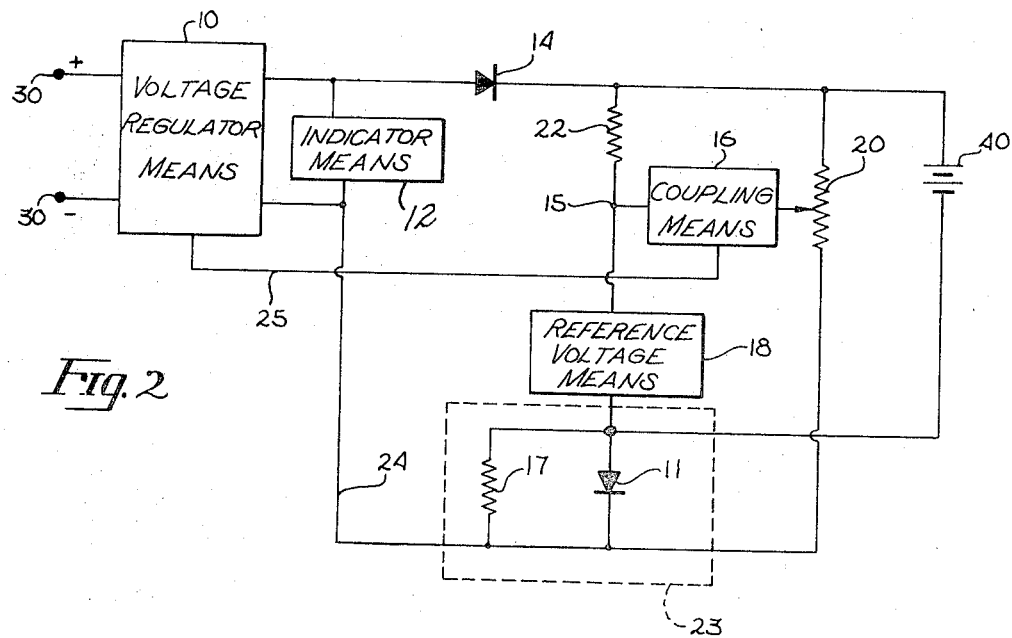
FIG. 2 is an electrical schematic of a charging circuit containing the present invention; and, FIG. 3 is a detailed schematic of an embodiment of the present invention.

The system outlined above may be more specifically understood by referring to FIG. 2 wherein the voltage regulator system 5 is shown as comprising a voltage regulator means 10, reference voltage means 18, coupling means 16 and associated resistors 20 and 22. Regulator 10 receives an input of DC potential with the polarity shown at terminals 30. This input provides the power used to charge battery 40. In one prior art circuit, battery 40 was coupled in parallel with regulator 10. With the improvement of the present invention, battery 40 is primarily in series with regulator 10 and the parallel combination of a junction device (e.g., diode) 11 and resistor 17. Regulator 10 may be any one of numerous DC voltage regulation circuits known in the prior art. Regulator 10 is coupled to the anode of diode 14. The cathode of diode 14 is coupled to the positive terminal of battery 40. Diode 14 prevents the flow of current from battery 40 into regulator 10 when the terminal voltage of battery 40 is greater than the output voltage of regulator 10. The voltage output of regulator 10 is controlled by a signal applied to regulator 10 on lead 25, this signal is developed in coupling means 16.

Indicator means 12 is coupled across the output of regulator 10. Indicator 12 is used to give an indication of the output voltage of regulator 10. As will be seen in the present invention, the voltage developed at the output of regulator 10 is indicative of the state of charge of battery 40, the presence of battery 40 in the circuit, the presence of power in regulator 10 and the capacity of battery 40. Thus, indicator 12 is also an indicator of these characteristics; indication 12 may be a light; an alarm, triggered by a voltage-sensitive circuit, such as a Schmitt trigger; or any one of numerous other well known indicator means.

Coupling means 16 provides regulator 10 with a signal representative of the terminal voltage of battery 40 and a reference voltage. One input to coupling means 16 is developed across potentiometer 20, which is in series with battery 40 and the parallel combination of resistor 17 and diode 11. Potentiometer 20 may be any commercially available potentiometer or variable resistance means (e.g., FET). The reference voltage for coupling means 16 is sensed at junction 15.

The reference voltage for coupling means 16 is developed by reference voltage means 18 and the parallel combination of resistor 17 and diode 11. The series combination of resistor 22, reference means 18 and the parallel combination of resistor 17 and diode 11 is coupled in parallel with the output of regulator 10 and diode 14. Reference means 18 may be any means which provides a constant reference voltage, independent of the current through the means. For example, reference means 18 may be a reverse biased Zener diode or a forward biased diode. The power for reference means 18 is supplied by regulator 10 or battery 40. Resistor 22 is utilized to limit the current through reference means 18.

Coupling means 16 may be an electrical component suitable for performing a coupling function such as a transistor. Coupling means 16 provides a signal to regulator 10 indicative of the terminal voltage of battery 40 relative to a reference voltage developed across means 18 and the parallel combination of resistor 17 and diode 11.

The operation of the circuit of FIG. 2 can be best understood by first examining the circuit, when the battery is being charged, and secondly when the battery is completely charged.

Assuming that battery 40 is not fully charged and a direct current potential is applied at terminals 30 with a polarity as indicated and from a source not shown, then current flows from regulator 10 through diode 14, battery 40 and returns to regulator 10 via the parallel combination of diode 11 and resistor 17. This current charges battery 40.

The terminal voltage of battery 40 is sensed by coupling means 16 across potentiometer 20. As the terminal voltage of battery 40 rises, the voltage output of regulator 10 increases as a result of coupling means 16 sensing the terminal voltage and coupling a resultant signal to regulator 10 via lead 25. Thus, as battery 40 approaches a predetermined terminal voltage, which indicates battery 40 is fully charged, the current flows from the regulator 10 to battery 40.

During the charging of battery 40, indicator means 12 senses the charging voltage to the battery produced by regulator 10. For a 12 volt battery, the typical output voltage for regulator 10 would be approximately 14 volts and this voltage would slowly increase to about 16 volts as battery 40 becomes fully charged.

While battery 40 is being charged, the charging current which passes through battery 40 then flows primarily through diode 11 and almost no current flows through resistor 17 since the forward resistance of diode 11 is much less than the resistance of resistor 17. As the terminal voltage of battery 40 increases, the battery 40 via resistor 17 and resistor 20 applies a voltage to diode 11 (across resistor 17) which reverse biases diode 11. Thus, by properly selecting the values of resistor 17 and resistor 20, diode 11 can be reverse biased at a predetermined terminal voltage of battery 40. This condition should ideally occur when the battery is fully charged. When diode 11 becomes reverse biased, the current path of the charging current trough battery 40 is substantially terminated or interrupted since no current flows through diode 11 and only resistor 17 with its higher resistance forms a circuit path. This results in a change of voltage at the junction of diode 11 and reference means 18 resulting in a change of the reference voltage sensed by coupling means 16 at junction 15. When this change in the reference voltage occurs, it is sensed by regulator 10 on lead 25 and causes the output of regulator 10 to drop considerably. For example, with a twelve (12) volt battery, typical regulator ouput would drop to six (6) volts. Thus, when the battery is fully charged, the output voltages of regulator 10 is approximately six (6) volts. Indicator 12 would sense this voltage since it is coupled across regulator 10 and the indicator, if a light, would become dim (or turn off). Thus, a light would go from bright to dim (or off) as the battery goes from a charging to a non-charging state.

The terminal voltage of battery 40 while it is fully charged is greater than the six (6) volt output of regulator 10, and therefore no current flows from the battery into the regulator since diode 14 is reverse biased. Two current paths exist which continually load the battery. The first path is through resistor 22, reference means 18 and resistor 17; and the second is through resistor 20 and resistor 17. These two current paths slowly cause the battery to lose its charge. As the battery loses its charge, less current flows through resistor 17, thereby changing the reference voltage sensed at junction 15 by coupling means 16 which gradually causes the output of voltage regulator 10 to increase. Eventually, the terminal voltage of battery 40 drops to a level where diode 11 is no longer reverse biased. This results in a current flow from regulator 10 through battery 40 and the battery begins to recharge thereby completing a periodic charging cycle. This cycle will repeat and indicator 12 will blink at a rate which is indicative of the rate at which the cycle is repeated. The blinking rate can be changed by changing the value of resistance.

Note that if battery 40 is removed from the circuit of FIG. 2, the voltage previously applied across diode 11 through resistor 17 no longer exists since the source of this voltage was battery 40. This causes the referenced voltage sensed at junction 15 to change, thereby causing the output of regulator 10 to increase. For a typical twelve (12) volt battery, the output of regulator 10 sensed by indicator means 12 rises to approximately 18.5 volts when battery 40 is removed from the circuit. In the case of a light, this would be represented by an especially bright indication.

Figure 3:
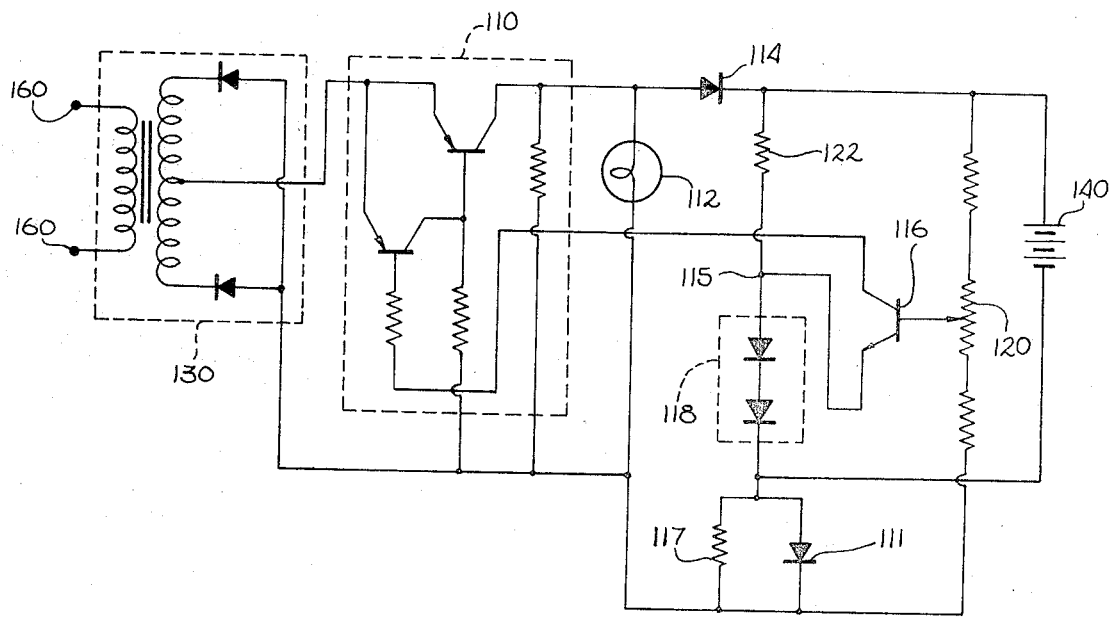

Referring to FIG. 3, the DC voltage applied to regulator 10 of FIG. 2 is obtained from a typical rectification circuit shown within dotted line 130. Regulator 10 of FIG. 2 has been replaced with a DC voltage regulator shown within dotted line 110. Indicator means 12 of FIG. 2 has been replaced with an ordinary light bulb 112. Diode 14, resistor 20, resistor 17, diode 11 and battery 40 of FIG. 2 are again shown as diode 114, resistor 120, resistor 117, diode 111 and battery 140, respectively in FIG. 3. Reference means 18 of FIG. 2 has been replaced by two (2) or more diodes as shown within dotted line 118. Coupling means 16 of FIG. 2 has been replaced with transistor 116.

The operation of the circuit shown in FIG. 3 is identical to that discussed with reference to FIG. 2. In the operation of the circuit shown in FIG. 3, an alternating current (AC) voltage is applied to terminals 160; battery 140 is again periodically charged as previously explained.

By observing the intensity of bulb 112, the state of charge and presence of battery 140 in the charging circuit may be determined. For example, if battery 140 were removed from the circuit, the voltage applied to bulb 112 would be greater than for any other condition and bulb 112 would glow very brightly. When the battery is being charged, the bulb glows with a lesser intensity than for the case of no battery; this intensity slowly increases as the battery reaches its fully charged condition. When the battery is fully charged, a very low voltage appears at the terminal of bulb 112, thereby causing the bulb to glow dimly. If no AC voltage were applied to terminal 160, bulb 112 would not glow at all.

By noting the frequency at which battery 140 is recharged (this is done by observing the frequency at which bulb 112 goes from a bright to dim), the capacity of the battery may be determined. For example, if the battery had very little capacity, it would require very frequent recharging thereby causing the frequency of recharging as indicated by bulb 112 to be greater than for a battery with a greater capacity. From experimentation, it has been found that an observer of bulb 112 can rapidly develop the skill required to determine the capacity of a battery. This is particularly true when several batteries are so arranged that the observer may simultaneously compare the frequency of recharging of several batteries. This characteristic of the invention enables a user to readily detect changes or deterioration in the capacity of a particular battery from time to time.

Bulb 112 may be replaced with any one of numerous commercially available alarm systems. For example, a remotely located alarm can be caused to signal the condition that occurs when battery 140 is removed from the circuit or the leads connecting the battery to the circuit become opened. Also, the condition of no AC power applied to terminal 160 can be sensed and transmitted to a remotely located alarm.

Thus, a charging circuit has been disclosed which gives an indication of the following:

(a) The state of the charge of the battery.
(b) The presence of charging power to the charging circuit.
(c) The presence of the battery in the charging circuit.
(d) The capacity of the battery.

In addition, the charging circuit does not supply a trickle charge to the battery thereby preventing the corrosion associated with trickle charges. The battery is rather charged periodically and continually loaded. It is believed that this form of charging will increase the life of the battery.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a circuit for charging a battery comprising a voltage regulator means for regulating the voltage applied to the battery wherein the output voltage of said regulator is controlled by the terminal voltage of the battery and a reference voltage means, the improvement comprising:
   a parallel combination of a resistance means and a junction device, said combination coupled to said battery and said voltage reference means;
   whereby said junction device is reverse biased by said resistance means when said battery terminal voltage reaches a predetermined voltage.

2. The improvement in claim 1 wherein said junction device is a diode.

3. The improvement in claim 1 wherein said parallel combination is coupled in series with said battery.

4. The improvement in claim 1 wherein an indicator means for indicating the output voltage of said regulator is coupled to said regulator.

5. The improvement in claim 4 wherein said indicator means is a light bulb.

6. In a circuit for charging a battery comprising a direct current regulator means for regulating the current supplied to the battery; a first diode coupled between said regulator means and said battery; reference means for supplying a reference voltage coupled to said diode; a coupling means for sensing the terminal voltage of the battery and said reference voltage of said reference means coupled to said regulator means, whereby the output of said regulator is controlled by said reference voltage and the terminal voltage of the battery; the improvement comprising:
   a parallel combination of a first resistance means and a second diode, coupled to the battery and coupled to said reference means;
   an indicator means coupled to said regulator for indicating the state of charge of the battery, the capacity of the battery, and the presence of the battery in the circuit.

7. The improvement in claim 6 including a second resistance means, coupled in series wtih said parallel combination, said second resistance means and parallel combination being coupled in parallel with said battery.

8. A circuit for charging a battery where said battery has at least a first and second lead comprising:
- a regulator means for regulating a direct current having at least a first and second lead and a control lead;
- an indicator means for indicating the voltage output of said regulator means coupled to said first and second lead of said regulator means;
- a diode coupled between said first lead of said regulator means and said first lead of said battery;
- a parallel combination of a resistance means and a diode means having at least two leads, said first lead coupled to said second lead of said battery and said second lead coupled to said second lead of said regulator means;
- a voltage reference means coupled between said first lead of said battery and said first lead of said parallel combination;
- a first resistance means coupled between said first lead of said battery and said second lead of said parallel combination;
- a coupling means for sensing the terminal voltage of the battery and said reference means and for providing an output signal representative thereof, coupled to said first resistance means, said reference means and said control lead of said regulator means;
- whereby said indicator means will indicate the state of charge of the battery, the capacity of the battery, the presence of the battery in the circuit and the presence of regulator power.

9. The circuit defined in claim 8 wherein said reference means consists of a second resistance means and diode means coupled in series.

10. The circuit defined in claim 9 wherein said coupling means is a transistor having at least a base, emitter, and collector electrodes, said base electrode coupled to said first resistance means, said collector electrode coupled to the control lead of said regulator and said emitter electrode coupled to said reference means.

11. The circuit defined in claim 10 wherein said first resistance means comprises a potentiometer.

12. In a system for charging a battery, the combination comprising:
- a voltage regulator system means coupled to a battery for periodically applying a predetermined voltage to the battery when the terminal voltage of the battery reaches a predetermined condition;
- step function means coupled to said voltage regulator system means and the battery for sensing the terminal voltage of the battery and for generating a step function signal and to reduce the output of said voltage regulator system means; and
- indicator means coupled to said voltage regulator system means for indicating the presence of the battery and the presence of charging power to said voltage regulator system means.

13. The structure defined in claim 12 wherein said indicator means indicates the state of charge of the battery and capacity of said battery.

14. The structure defined in claim 12 wherein a solid state junction device for permitting current flow in one direction is coupled between said voltage regulator system means and the battery to enable current to flow from said voltage regulator system means to the battery when a predetermined voltage difference exists between the output voltage of the regulator system and the terminal voltage of the battery.

15. The structure defined in claim 14 wherein said step function means also continuously loads said battery so that the battery is gradually discharged.

References Cited

UNITED STATES PATENTS

| | | | |
|---|---|---|---|
| 2,013,618 | 9/1935 | Woodbridge | 320—40 |
| 3,424,969 | 1/1969 | Barry | 320—21 |
| 3,465,230 | 9/1969 | Ball | 320—39X |

WILLIAM M. SHOOP, JR., Primary Examiner

U.S. Cl. X.R.

320—48, 53